United States Patent Office 3,470,229
Patented Sept. 30, 1969

3,470,229
O,O-DIALKYL-O-(DITHIOCARBONATO) ETHYL-PHOSPHORIC ACID ESTERS
Gerhard Schrader, Wuppertal-Cronenberg, Wolfgang Behrenz, Cologne-Stammheim, and Ingeborg Hammann, Cologne, Germany, assignors to Farbenfabriken Bayer Aktiengesellschaft, Leverkusen, Germany, a corporation of Germany
No Drawing. Filed Oct. 21, 1966, Ser. No. 588,337
Claims priority, application Germany, Oct. 29, 1965, F 47,553
Int. Cl. C07f 9/08, 9/02; A01n 9/36
U.S. Cl. 260—455                                   4 Claims

ABSTRACT OF THE DISCLOSURE

O,O-dialkyl-O-(dithiocarbonato) ethyl-phosphoric acid ester of the formula

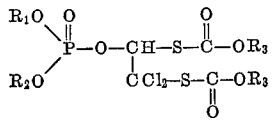

in which $R_1$ and $R_2$ each respectively is alkyl or chloroalkyl, and $R_3$ is alkyl, which possess insecticidal and acaricidal properties.

---

The present invention relates to particular new phosphoric acid esters which possess pesticidal, especially insecticidal and acaricidal, properties, to their compositions with dispersible carrier vehicles, and to methods for the production and use thereof.

Pesticides, especially insecticides, based on O,O-dialkyl-di-(alkylmercapto-vinyl)-phosphoric acid or -thiophosphoric acid esters are already known from U.S. Patent No. 2,864,741.

Furthermore, German patent specification No. 1,190,246 describes insecticidal, acaricidal and fungicidal agents which contain O,O-dimethyl-O-(1,2-dibromo-2,2-dichloro-vinyl)-phosphoric acid esters.

It is an object of the present invention to provide particular new O,O-dialkyl-O-(dithiocarbonato)ethyl-phosphoric acid esters which possess valuable pesticidal, especially insecticidal and/or acaricidal, properties, to provide active compositions in the form of mixtures of such compounds with solid and liquid dispersible carrier vehicles, to provide a process for producing such compounds, and to provide methods of using such compounds in a new way, especially for combating pests, especially insects and acarids, and the like.

Other and further objects of the present invention will become apparent from a study of the within specification and accompanying examples.

It has now been found, in accordance with the present invention, that the particular new O,O-dialkyl-O-(dithiocarbonato) ethyl-phosphoric acid esters having the general formula:

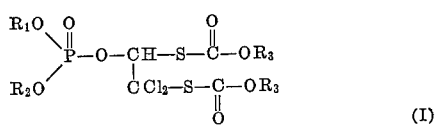

in which $R_1$ and $R_2$ each respectively is selected from the group consisting of lower alkyl and chloro-lower alkyl, and chloro-lower alkyl, and $R_3$ is lower alkyl, exhibit outstandingly strong pesticidal, especially insecticidal and acaricidal, properties.

It has been further found in accordance with the present invention that the compounds of Formula I above may be obtained in a smooth reaction and with good yields by the process which comprises reacting O,O-dialkyl-O-(1,2-dibromo-2,2-dichloro-ethyl)-phosphoric acid esters having the general formula

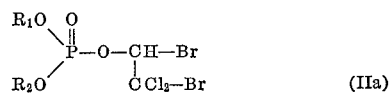

with O-alkyl-thiocarbonic acid salts having the general formula

in which M denotes an alkali metal atom, such as potassium or sodium, or the $NH_4$, i.e. ammonium, group, and $R_1$, $R_2$ and $R_3$ are the same as defined above.

The course of the production process according to the invention may be illustrated by the following equation:

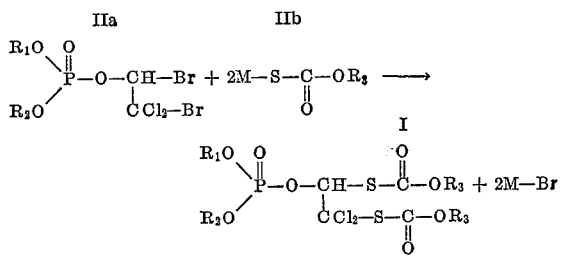

In the above equation, the symbols $R_1$, $R_2$, $R_3$ and M are the same as defined above.

The O,O - dialkyl-O-(1,2-dibromo-2,2-dichloro-ethyl)-phosphoric acid esters used as starting material for the above process can easily be obtained, even on an industrial scale, by bromination of the corresponding O,O-di-alkyl-O-(2,2-dichlorovinyl) phosphates under the conditions stated in German patent specification No. 1,190,246.

The O-alkyl-thiocarbonic acid salts used as the second starting material have also already been described in the literature and can also be prepared by known methods.

The reaction according to the invention is preferably carried out in the presence of solvents and/or diluents. Virtually all inert organic solvents can be used for the purpose. They include hydrocarbons, which may be halogenated, for example benzine, benzene, toluene, xylene and chlorobenzene, and also ethers, for example diethyl ether and dibutyl ether, dioxan and tetrahydrofuran. However, low-boiling aliphatic ketones or nitriles, for example ketone as well as acetonitrile and propionitrile have proved to be especially satisfactory as solvents or diluents.

The temperature of the reaction may be varied within a fairly wide range. In order to achieve particularly good yields and pure products, the operation is generally carried out at substantially between about 15 to 50° C., and preferably at about 20 to 40° C.

As can be seen from the reaction equation, 2 mols of O-alkylthiocarbonic acid salt are used for every mol of O,O - dialkyl - O - (1,2 - dibromo - 2,2 - dichloroethyl)-phosphoric acid ester when carrying out the process according to the invention. It has proved to be expedient to mix first the salt concerned with a suitable solvent or diluent and to add the dibromo compound dropwise to this mixture, while stirring. When the addition is completed, the reaction mixture is further stirred at the stated temperatures for about 1 to 3 hours in order to complete the reaction, and then worked up in the usual manner.

The products of the process are usually colorless to slightly yellow, viscous, water-insoluble oils which can be distilled under strongly reduced pressure without decomposition.

The particular new phosphoric acid esters of the instant invention possess outstanding insecticidal and acaricidal activity and only a low toxicity to warm-blooded animals and a concomitantly low phytotoxicity. The effect sets in rapidly and is long-lasting.

Compared with the active compounds of analogous constitution and the same type of activity hitherto known from the literature, the products of the present invention are surprisingly characterized by a substantially higher effectiveness. They thus constitute a genuine enrichment of the art. On account of such properties, the instant new compounds may be used with markedly good results in plant protection for combating sucking and biting insects, Diptera and mites (Acarina), in the field of hygiene and also for protecting stored goods against a great number of animal or insect pests.

The sucking insects essentially include aphids, such as the peach aphid (*Myzus persicae*), the black beam aphid (*Doralis fabae*); scales, such as *Aspidiotus hederae, Lecandum hesperidum, Pseudococcus maritimus; Thysanoptera*, such as *Hercinothrips femoralis*; and bugs, such as the beet bug (*Piesma quadrata*) and the bed bug (*Cimex lectularius*), and the like.

The biting insects essentially include butterfly larvae, such as *Plutella maculipennis, Lymantria dispar*; beetles, such as grain weevils (*Sitophilus granarius*), the Colorado beetle (*Leptinotarsa decemlineata*), but also species living in the soil, such as wire worms (Agriotes sp.) and cockchafer larvae (*Melolontha melolontha*); cockroaches, such as the German cockroach (*Blattella germanica*); the American cockroach (*Periplaneta americana*) and the Oriental cockroach (*Blatta orientalis*); Orthopetra, such as the cricket (*Acheta domesticus*); termites, such as Reticulitermes; Hymenoptera, such as ants, and the like.

The Diptera essentially include the flies, such as the vinegar fly (*Drosphila melanogaster*), the Mediterranean fruit fly (*Ceratitis capitata*), the house fly (*Musca domestica*), and gnats, such as mosquitoes (*Aedes aegypti, Culex pipiens* and *Anopheles stephensi*), and also blowflies, such as *Lucilia serioata* and *Chrysomya chloropyga*, and the like.

Among the mites, the spider mites (Tetranychidae) are of particular importance, such as the common spider mite (*Tetranychus urticae*), the fruit tree spider mite (*Paratetranychus pilosus*); gall mites, such as the red currant gall mite (*Eriophyes ribis*) and tarsonemides, such as *Tarsonemus pallidus*; and also ticks, such as the relapsing fever tick (*Ornithodoros moubata*) and *Boophilus microplus*, and the like.

Thus, the particular compounds of the instant invention be used as pesticides either alone or in admixture with solid or liquid carriers or diluents.

The active compounds according to the instant invention can be utilized, if desired, in the form of the usual formulations or compositions with dispersible carrier vehicles, such as solutions, emulsions, suspensions, emulsifiable concentrates, spray powders, pastes, soluble powders, dusting agents, granulates, etc. These are prepared in known manner, for instance, by extending the active agents with dispersible liquid diluent carriers and/or dispersible solid carriers optionally with the use of carrier vehicle assistants, e.g., surface-active agents, including emulsifying agents and/or dispersing agents, whereby, for example, in the case where water is used as diluent, organic solvents may be added as auxiliary solvents (cf. Agricultural Chemicals, March 1960, pp. 35–38). The following may be chiefly considered for use as carrier vehicles for this purpose: dispersible liquid diluent carriers, such as aromatic hydrocarbons (for instance, benzene, toluene, xylene, etc.), halogenated, especially chlorinated, aromatic hydrocarbons (for instance, chlorobenzenes), paraffins (for instance, petroleum fractions), chlorinated aliphatic hydrocarbons (for instance, methylene chloride, etc.), alcohols (for instance, methanol, ethanol, propanol, butanol, etc.), ethers, ether-alcohols (for instance, glycol monomethyl ether, etc.), amines (for instance, ethanolamine, etc.), amides (for instance, dimethyl formamide, etc.), sulfoxides (for instance, dimethyl sulfoxide, etc.), ketones (for instance, acetone, etc.), and water; as well as dispersible finely divided solid carriers, such as ground natural minerals (for instance, kaolins, alumina, silica, chalk, i.e., calcium carbonate, talc, kieselguhr, etc.) and ground synthetic minerals (for instance, highly dispersed silicic acid, silicates, e.g., alkali silicates, etc.); whereas the following may be chiefly considered for use as carrier vehicle assistants, e.g., surface-active agents, for this purpose: emulsifying agents, such as nonionic and anionic emulsifying agents (for instance, polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and dispersing agents, such as lignin, sulfite waste liquors, methyl cellulose, etc.

As will be appreciated by the artisan, the active compounds according to the instant invention may be present in such formulations or compositions in the form of mixtures with one another and with other known active substances, if desired.

The substances according to the invention may be employed, therefore, by themselves as the artisan will appreciate, in the form of their compositions with solid or liquid dispersible carrier vehicles or other known compatible active agents, or in the form of particular dosage preparations for specific application made therefrom, such as solutions, emulsions, suspensions, powders, pastes, and granulates which are thus ready for use.

As concerns commercially marketed preparations, these generally contemplate carrier composition mixtures in which the active compound is present in an amount substantially between about 0.1 and 95% by weight, and preferably 0.5 and 90% by weight, of the mixture, whereas carrier composition mixtures suitable for direct application or field application generally contemplate those in which the active compound is present in an amount substantially between about 0.000001 and 20%, preferably 0.00001 and 10%, by weight of the mixture. Thus, the present invention contemplates over-all compositions which comprise mixtures of a dispersible carrier vehicle such as a dispersible carrier solid, or a dispersible carrier liquid preferably including a carrier vehicle assistant, e.g., a surface-active agent, such as an emulsifying agent and/or a dispersing agent, and an amount of the active compound which is effective for the purpose in question and which is generally between about 0.000001 and 95% by weight of the mixture.

Furthermore, the present invention contemplates methods of selectively controlling or combating pests, and especially insects and/or acarids, and the like, which comprise applying to at least one of (a) such pests and (b) their habitat, a pesticidally effective amount of the particular active compound of the invention alone or together with a carrier vehicle as noted above. The instant formulations or compositions are applied in the usual manner, for example, by spraying, atomizing, scattering, dusting, watering, sprinkling, vaporizing, fumigating, and the like.

The unexpected superiority and the outstanding effect of the particular new compounds of the present invention, when applied against a great number of pests, can be seen from the following test results:

EXAMPLE 1

Chrysomyia maggot test

Solvent: 3 parts by weight acetone
Emulsifier: 1 part by weight alkylaryl polyglycol ether To produce a suitable preparation of the particular active compound, 1 part by weight of such active compound is mixed with the stated amount of solvent. The stated emulsifier is added to this preliminary mixture and the concentrate so obtained is diluted with water to the desired final concentration.

About 20 blowfly maggots (*Chrysomyia chloropyga*) are placed into a small glass which contains 1 to 2 g. meat and about 1.2 ml. of the preparation of active compound prepared as described above. After 48 hours, the degree of destruction of the test insects is determined as a percentage: 100% means that all the maggots have been killed, whereas 0 means that none are killed.

The tested active compounds, the concentrations applied and the results obtained can be seen from the following Table 1:

EXAMPLE 2

Aerosol test

Test insects: House fly (*Musca domestica*)
Solvent: Acetone

To produce a suitable preparation of the particular active compound, the active compounds are dissolved in the solvent mentioned above in such quantities that the concentrates given in Table 2 are obtained.

A wire cage containing about 25 test insects is suspended in the centre of a gas-tight glass chamber of 1 cubic metre capacity. After the chamber has been closed, 2 ml. of the preparation of the given active compound are atomized therein. The condition of the test insects is continuously observed from the outside through the glass walls, and the period of time is determined which is required for a 100% knock down effect on the insects.

The active compounds tested, their concentrations and the periods of time which bring about a 100% knock down can be seen from the following Table 2:

TABLE 1

| Active compound (constitution) | Toxicity towards warm-blooded animals $DL_{50}$ on rats per os as mg./kg. | Concentration of active compound as p.p.m. (parts per million) | Degree of destruction as percent |
|---|---|---|---|
| III 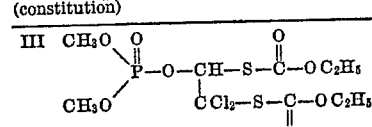 | 100 | 10<br>3 | 100<br>50 |
| IV 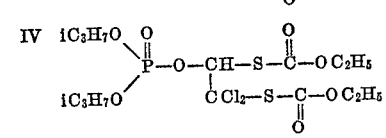 | 50 | 10<br>3 | 100<br>50 |

TABLE 2.—AEROSOL TEST

| | Concentration of active compound | | |
|---|---|---|---|
| Active compound (constitution) | Percent solution | Mg./m.³ air | $LT_{100}$ ('=minutes) |
| III 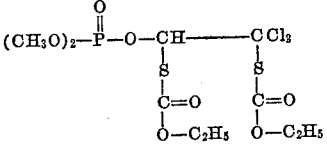<br>(According to invention) | 0.25 | 5 | 9' |
| A 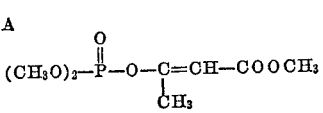<br>(Known from U.S. Patent No. 2,685,552) | 0.25 | 5 | 17' |
| B $(CH_3O)_2-\overset{O}{\overset{\|}{P}}-O-CHBr-CCl_2Br$<br>(Known from German Published Patent No. 1,190,246) | 0.25 | 5 | 18.5' |
| C 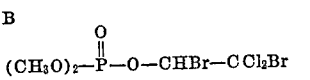<br>(Known from German Patent No. 847,897) | 1 | 20 | (¹) |

¹ After 60': 45%.

EXAMPLE 3

$LT_{100}$ test for Diptera

Test insects: Mosquitoes (*Aedes aegypti*)
Solvent: Acetone 2 parts by weight of the particular active compound are dissolved in 1000 parts by volume of solvent. The resultant solution is diluted with a further amount of solvent to the desired lower concentration.

2.5 ml. of the solution of the given active compound are transferred to a petri dish by means of a pipette, a filter paper of about 9.5 cm. diameter being disposed on the bottom of the petri dish. The petri dish is left uncovered until the solvent has completely evaporated. The amount of active compound per square metre of filter paper varies with the concentration of the solution of active compound used. About 25 test insects are placed in the petri dish which is then covered with a glass lid.

The condition of the test insects is continuously observed. The period of time required for a 100% knock down effect is determined.

The active compounds tested, their concentrations and the periods of time which bring about a 100% knock down effect, can be seen from the following Table 3:

TABLE 3.—$LT_{100}$ TEST FOR DIPTERA

| Active compound (constitution) | Concentration of active compound, percent solution | $LT_{100}$ ('=minutes) (h=hours) |
|---|---|---|
| (III) $(CH_3O)_2\overset{O}{\underset{\|}{P}}-O-\underset{\underset{\underset{O-C_2H_5}{\|}}{\underset{C=O}{\|}}}{\overset{\|}{S}}CH---\underset{\underset{\underset{O-C_2H_5}{\|}}{\underset{C=O}{\|}}}{\overset{\|}{S}}CCl_2$ (According to invention) | 0.2<br>0.02<br>0.002<br>0.0002<br>0.00002 | 60'<br>60'<br>60'<br>120'<br>3h, 0% |
| (C) $(CH_3O)_2\overset{S}{\underset{\|}{P}}-S-CH-COOC_2H_5$<br>$\phantom{(CH_3O)_2\overset{S}{\underset{\|}{P}}-S-}\underset{\|}{CH_2}-COOC_2H_5$ (Known from German Patent No. 847,897) | 0.2<br>0.02<br>0.002<br>0.0002 | 60'<br>120'<br>180'<br>3h, 0% |

EXAMPLE 4

$LD_{100}$ test

Test insects: Oriental cockroach (*Blatta orientalis*)
Solvent: Acetone 2 parts by weight of the particular active compound are dissolved in 1000 parts by volume of the solvent. The solution thus obtained is diluted with a further amount of solvent to the desired final concentration.

2.5 ml. of the solution of the given active compound are transferred to a petri dish by means of a pipette, a filter paper of about 9.5 cm. diameter being disposed on the bottom of the petri dish. The petri dish is left uncovered until the solvent has completely evaporated. The amount of active compound per square metre of filter paper varies with the concentration of the solution of active compound used. About 25 test insects are subsequently placed in the petri dish, which is then covered with a glass lid.

The condition of the test insects is observed one day and three days after the start of the test. The knock down effect is determined as a percentage.

The active compounds, their concentrations, and the results obtained can be seen from the following Table 4:

TABLE 4.—$LD_{100}$ TEST

| Active compound (constitution) | Concentration of active compound, percent solution | Knock down effect as percent |
|---|---|---|
| (III) $(CH_3)_2\overset{O}{\underset{\|}{P}}-O-\underset{\underset{\underset{O-C_2H_5}{\|}}{\underset{C=O}{\|}}}{\overset{\|}{S}}CH---\underset{\underset{\underset{O-C_2H_5}{\|}}{\underset{C=O}{\|}}}{\overset{\|}{S}}CCl_2$ (According to invention) | 0.2<br>0.02<br>0.002 | 100<br>100<br>0 |
| (C) $(CH_3O)_2\overset{S}{\underset{\|}{P}}-S-CH-COOC_2H_5$<br>$\phantom{(CH_3O)_2\overset{S}{\underset{\|}{P}}-S-}\underset{\|}{CH_2}-COOC_2H_5$ (Known to German Patent No. 847,897) | 0.2<br>0.02 | 100<br>0 |

EXAMPLE 5

$LD_{100}$ test

Test insects: Cricket (*Acheta domesticus*)
Solvent: Acetone 2 parts by weight of the particular active compound are dissolved in 1000 parts by volume of the solvent. The solution thus obtained is diluted with a further amount of solvent to the desired final concentration.

2.5 ml. of the solution of the given active compound are transferred to a petri dish by means of a pipette, a filter paper of about 9.5 cm. diameter being disposed on the bottom of the petri dish. The petri dish is left uncovered until the solvent has completely evaporated. The amount of active compound per square metre of filter paper varies with the concentration of the solution of active compound used. About 25 test insects are subsequently placed in the petri dish, which is then covered with a glass lid.

The condition of the test insects is observed one day and three days after the start of the test. The knock down effect is determined as a percentage.

The active compound, their concentrations, and the results obtained can be seen from the following Table 5:

TABLE 5.—$LD_{100}$ TEST

| Active compound (constitution) | Concentration of active compound, percent solution | Knock down effect as percent |
|---|---|---|
| (III) $(CH_3O)_2\overset{O}{\underset{\|}{P}}-O-\underset{\underset{\underset{O-C_2H_5}{\|}}{\underset{C=O}{\|}}}{\overset{\|}{S}}CH---\underset{\underset{\underset{OC_2H_5}{\|}}{\underset{C=O}{\|}}}{\overset{\|}{S}}CCl_2$ (According to invention) | 0.2<br>0.02<br>0.002 | 100<br>100<br>60 |
| (C) $\underset{CH_3O}{\overset{CH_3O}{\diagdown}}\overset{S}{\underset{\|}{P}}-S-CH-COOC_2H_5$<br>$\phantom{xxxxxxxxxxxx}\underset{\|}{CH_2}-COOC_2H_5$ (Known from German Patent No. 847,897) | 0.2<br>0.02<br>0.002 | 100<br>40<br>0 |

EXAMPLE 6

Phaedon test

Solvent: 3 parts by weight acetone
Emulsifier: 1 part by weight alkylaryl polyglycol ether To produce a suitable preparation of the particular active compound, 1 part by weight of such active compound is mixed with the stated amount of solvent containing the stated amount of emulsifier and the concentrate is diluted with water to the desired final concentration.

Horse-radish leaves (*Cochlearie armoratia*) are sprayed with the preparation of the given active compound until dripping wet and then infested with larvae of the horse-radish beetle (*Phaedon cochleariae*).

After a specified period of time, the degree of destruction is determined as a percentage: 100% means that all the beetles are killed, whereas 0% means that none are killed.

The active compounds, their concentrations, the evaluation time and the results obtained can be seen from the following Table 6:

TABLE 6

| Active compound (constitution) | Concentration of active compound as percent | Degree of destruction as percent after 3 days |
|---|---|---|
| (III) $\underset{(CH_3O)_2\overset{\|}{\underset{\|}{P}}-O-\overset{\|}{\underset{\|}{CH}}-S-CO-O-C_2H_5}{\overset{O \quad CCl_2-S-CO-O-C_2H_5}{}}$ | 0.1<br>0.01 | 100<br>100 |
| (IV) $\underset{(C_3H_7O\text{-iso})_2\overset{\|}{\underset{\|}{P}}-O-\overset{\|}{\underset{\|}{CH}}-S-CO-O-C_2H_5}{\overset{O \quad CCl_2-S-CO-O-C_2H_5}{}}$ | 0.1<br>0.01 | 100<br>100 |

EXAMPLE 7

Drosophila test

Solvent: 3 parts by weight acetone
Emulsifier: 1 part by weight alkylaryl polyglycol ether To produce a suitable preparation of the particular active compound, 1 part by weight of such active compound is mixed with the stated amount of solvent containing the stated amount of emulsifier and the concentrate is diluted with water to the desired final concentration.

1 cc. of the preparation of the given active compound is applied with a pipette to a filter paper disc of 7 cm. diameter. The wet disc is placed in a glass vessel containing 50 vinegar flies (*Drosophila melanogaster*) and covered with a glass plate.

After a specified period of time, the destruction is determined as a percentage: 100% means that all the flies are killed whereas 0% means that none are killed.

The active compounds, their concentrations, the evaluation time and the degree of destruction can be seen from the following Table 7:

TABLE 7

| Active compound (constitution) | Concentration of active compound as percent | Degree of destruction as percent after 24 hours |
|---|---|---|
| (III) $\underset{(CH_3O)_2\overset{\|}{\underset{\|}{P}}-O-\overset{\|}{\underset{\|}{CH}}-S-CO-O-C_2H_5}{\overset{O \quad CCl_2-S-CO-O-C_2H_5}{}}$ | 0.1<br>0.01<br>0.001<br>0.0001<br>0.00001 | 100<br>100<br>100<br>100<br>50 |
| (IV) $\underset{(C_3H_7O\text{-iso})_2\overset{\|}{\underset{\|}{P}}-O-\overset{\|}{\underset{\|}{CH}}-S-CO-O-C_2H_5}{\overset{O \quad CCl_2-S-CO-O-C_2H_5}{}}$ | 0.1<br>0.01<br>0.001<br>0.0001 | 100<br>100<br>100<br>100 |

EXAMPLE 8

Myzus test (contact action)

Solvent: 3 parts by weight acetone
Emulsifier: 1 part by weight alkylaryl polyglycol ether To produce a suitable preparation of the particular active compound, 1 part by weight of such active compound is mixed with the stated amount of solvent containing the stated amount of emulsifier and the concentrate is diluted with water to the desired final concentration.

Cabbage plants (*Brassica oleracea*) which have been heavily infested with peach aphids (*Myzus persicae*) are sprayed with the preparation of the given active compound until dripping wet.

After a specified period of time, the degree of destruction is determined as a percentage: 100% means that all the aphids are killed whereas 0% means that none are killed.

The active compounds, their concentrations, the evaluation time and the results obtained can be seen from the following Table 8:

TABLE 8

| Active compound (constitution) | Concentration of active compound as percent | Degree of destruction as percent after 24 hours |
|---|---|---|
| (III) $(CH_3O)_2\overset{O}{\overset{\|}{P}}-O-\overset{CCl_2-S-CO-O-C_2H_5}{\underset{\|}{CH}}-S-CO-O-C_2H_5$ | 0.1<br>0.01 | 100<br>40 |
| (IV) $(C_3H_7O\text{-iso})_2\overset{O}{\overset{\|}{P}}-O-\overset{CCl_2-S-CO-O-C_2H_5}{\underset{\|}{CH}}-S-CO-O-C_2H_5$ | 0.1 | 100 |

EXAMPLE 9

Rhopalosiphum test (systemic action)

Solvent: 3 parts by weight acetone
Emulsifier: 1 part by weight alkylaryl polyglycol ether To produce a suitable preparation of the particular active compound, 1 part by weight of such active compound is mixed with the stated amount of solvent containing the stated amount of emulsifier, and the concentrate is diluted with water to the desired final concentration.

Oat plants (*Avena sativa*) which have been strongly infested with oat aphids (*Rhopalosiphum padi*) are watered with the preparation of the given active compound so that the preparation penetrates into the soil without wetting the leaves of the oat plants. The active compound is taken up by the oat plants from the soil and thus reaches the infested leaves.

After a specified period of time, the degree of destruction is determined as a percentage: 100% means that all the aphids are killed whereas 0% means that none are killed.

The active compounds, their concentrations, the evaluation time and the results obtained can be seen from the following Table 9:

TABLE 9

| Active compound (constitution) | Concentration of active compound as percent | Degree of destruction as percent after 8 days |
|---|---|---|
| (III) $(CH_3O)_2\overset{O}{\overset{\|}{P}}-O-\overset{CCl_2-S-CO-O-C_2H_5}{\underset{\|}{CH}}-S-CO-O-C_2H_5$ | 0.1<br>0.01 | 100<br>100 |
| (IV) $(C_3H_7O\text{-iso})\overset{O}{\overset{\|}{P}}-O-\overset{CCl_2-S-CO-O-C_2H_5}{\underset{\|}{CH}}-S-CO-O-C_2H_5$ | 0.1 | 100 |

The following examples of producing the instant compounds are given for the purpose of illustrating, without limiting, the invention.

EXAMPLE 10

III 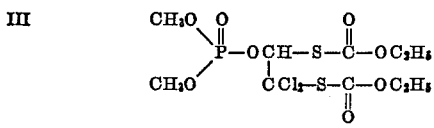

90 grams (0.3 mol) potassium O-ethyl-thiocarbonate are dissolved in 400 cc. acetonitrile. 114 grams O,O-dimethyl-O-(1,2-dibromo - 2,2 - dichloroethyl)-phosphoric acid ester (M.P. 25° C.) are added to this solution at 30 to 40° C., while stirring, and the mixture is then heated at 40° C. for a further hour. The reaction mixture is then diluted with 150 cc. benzene and washed with water. The separated benzene solution is dried over sodium sulfate. By a subsequent fractional distillation the compound O,O-dimethyl-O-[2,2-dichloro-1,2-di - (O' - ethyl - thiocarbonato)]ethyl-phosphoric acid ester of Formula III is obtained in the form of a water-insoluble colorless oil of B.P. 70° C./0.01 mm. Hg. The yield amounts to 80 g. (62% of theory).

EXAMPLE 11

IV 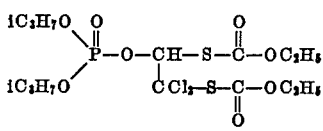

132 grams O,O-diisopropyl-O-1,2-dibromo-2,2-dichloroethyl-phosphoric acid ester are added at 20 to 40° C., while stirring, to a solution of 90 g. potassium O-ethyl-thiolcarbonate in 500 cc. acetonitrile. The mixture is subsequently heated at 40° C. for a further hour and then worked up as described in Example 10. 100 grams (69% of theory) of the compound O,O-diisopropyl-O-[2,2-dichloro-1,2-di-(O' - ethyl-thiocarbonato)] ethyl-phosphoric acid ester of Formula IV are obtained in the form of a water-insoluble colorless oil of B.P. 70° C./0.01 mm. Hg.

EXAMPLE 12

In the same manner, using the stated molar amounts of the following starting materials:

(a) O-methyl-O-ethyl-O-(1,2-dibromo - 2,2 - dichloroethyl)-phosphoric acid ester (0.3 mol), sodium O-tert-butyl-thiocarbonate (0.3 mol), and sodium O-n-propyl-thiocarbonate (0.3 mol);

(b) O - ethyl-O-n-butyl-O-(1,2-dibromo-2,2 - dichloroethyl)-phosphoric acid ester (0.3 mol), sodium O-methyl-thiocarbonate (0.3 mol), and sodium O-ethyl-thiocarbonate (0.3 mol); and (c) O-β-chloroethyl-O-chloromethyl - O - (1,2-dibromo-2,2-dichloro-ethyl)-phosphoric acid ester (0.3 mol), ammonium O-methyl-thiocarbonate (0.3 mol), and ammonium O-isopropyl-thiocarbonate (0.3 mol);

the following phosphoric acid ester compounds, respectively, are formed:

(a') O-methyl-O-ethyl - O - [2,2-dichloro-1-(O'-tert.-butyl-thiocarbonato)- - 2 - (O''-n-propyl-thiocarbonato)]-ethyl - phosphoric acid ester (i.e., together with minor amounts of O-methyl-O-ethyl-O-[2,2 - dichloro - 1,2 - di-(O'-tert.-butyl-thiocarbonato)] - ethyl - phosphoric acid ester and O-methyl-O-ethyl-O-[2,2 - dichloro - 1,2 - di-(O'-n-propyl-thiocarbonato)] - ethyl-phosphoric acid ester);

(b') O-ethyl-O-n-butyl-O-[2,2 - dichloro-1-(O'-methyl-thiocarbonato)-2-(O''-ethyl-thiocarbonato)] - ethyl-phosphoric acid ester (i.e., together with minor amounts of O-ethyl-O-n-butyl-O-[2,2 - dichloro - 1,2 - di - (O'-methyl-thiocarbonato)-ethyl-phosphoric acid ester and O-ethyl-O-n-butyl-O-[2,2 - dichloro - 1,2-di - (O' - ethyl-thiocarbonato)]-ethyl-phosphoric acid ester); and (c') O-β-chloroethyl-O-chloromethyl-O-[2,2 - dichloro-1-(O'-methyl - thiocarbonato) - 2 - (O''-isopropyl-thiocarbonato)]-ethyl-phosphoric acid ester (i.e., together with minor amounts of O-β-chloroethyl-O-chloromethyl-O-[2,2-dichloro-1,2-di-(O'-methyl - thiocarbonato)] - ethyl-phosphoric acid ester and O-β-chloroethyl-O-chloromethyl-O-[2,2-dichloro-1,2-di-(O' - isopropyl - thiocarbonato)]-ethyl-phosphoric acid ester).

Advantageously, in accordance with the present invention, in the foregoing formulae:

$R_1$ and $R_2$ each respectively represents lower alkyl such as methyl, ethyl, n-propyl, isopropyl, n-butyl, isobutyl, sec.-butyl, tert.-butyl, and the like, especially alkyl having 1 to 4 carbon atoms; or chlorolower alkyl such as chloromethyl, -ethyl, -n-propyl, -isopropyl, -n-butyl, -isobutyl, -sec.-butyl, -tert.-butyl, and the like, including mono, di- and poly-chloro substituted methyl to tert.-butyl inclusive as enumerated hereinabove, including β-chloroethyl, chloromethyl, etc., especially chloro-substituted lower alkyl having 1 to 4 carbon atoms; and Each $R_3$ respectively represents lower alkyl such as methyl to tert.-butyl inclusive as enumerated hereinabove, especially lower alkyl having 1 to 4 carbon atoms, with both radicals $R_3$ preferably being the same.

It will be realized by the artisan that all of the foregoing compounds contemplated by the present invention possess the desired pesticidal, especially arthoropodicidal, e.g. insecticidal and acaricidal, activity, and exhibit extremely low phytotoxicity as regards cultivated plants, as well as extremely low toxicity towards warm-blooded animals.

As contemplated herein, the terms "arthropod," "arthropodicidal" and "arthropodicide" may be defined as encompassing specifically both insects and acarids within the contemplation of their meaning, for convenience in determining the collective aspects of utility herein. Thus, the insects and acarids may be considered herein collectively as arthropods to be combated collectively in accordance with the invention, and accordingly the insecticidal and/or acaricidal activity may be termed arthropodicidal activity, and the concomitant combative or effective amount used in accordance with the invention will be an arthropodicidally effective amount which in essence means an insecticidally or acaricidally effective amount of the active compound for the desired purpose.

It will be appreciated that the instant specification and examples are set forth by way of illustration and not limitation, and that various modifications and changes may be made without departing from the spirit and scope of the present invention.

What is claimed is:

1. O,O-dialkyl-O-(dithiocarbonato)ethyl-phosphoric acid ester having the formula

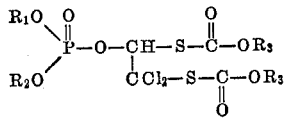

in which $R_1$ and $R_2$ each respectively is selected from the group consisting of lower alkyl and chloro-lower alkyl, and $R_3$ is lower alkyl.

2. Ester according to claim 1 wherein $R_1$, $R_2$, and $R_3$ each respectively has 1 to 4 carbon atoms.

3. Ester according to claim 1 wherein such ester is O,O-dimethyl - O - [2,2 - dichloro - 1,2 - di - (O' - ethyl - thiocarbonato)]-ethyl phosphoric acid ester having the formula

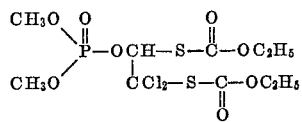

4. Ester according to claim 1 wherein such ester is O,O-diisopropyl - O - [2,2 - dichloro - 1,2 - di - (O' - ethylthiocarbonato)]-ethyl phosphoric acid ester having the formula

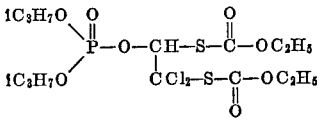

References Cited

FOREIGN PATENTS 1,498,055  10/1966  France.
772,640    11/1967  Canada.

CHARLES B. PARKER, Primary Examiner
D. R. PHILLIPS, Assistant Examiner

U.S. Cl. X.R.
424—225

PO-1050
(5/69)

UNITED STATES PATENT OFFICE
CERTIFICATE OF CORRECTION

Patent No. 3,470,229    Dated September 30, 1969

Inventor(s) Gerhard Schrader, Wolfgang Behrenz, and Ingeborg Ham

It is certified that error appears in the above-identified patent and that said Letters Patent are hereby corrected as shown below:

Column 1, line 67, cancel "and chloro-lower alkyl,"; Column 3, line 26, "Lecandum" should be --Lecanium--; column 3, line 39, "Orthopetra" should be --Orthoptera--; column 3, line 44, "Drosphila" should be --Drosophila--; column 3, line 48, "serioata" should be --sericata--; column 3, line 59, insert --can-- before "be"; column 8, line 51, "compound" should be --compounds--; column 10, Table 7, in structural formula (IV) the linkage 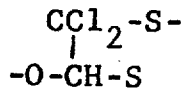 should be 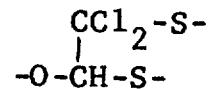

Column 13, line 19, "arthoropodicidal" should be --arthropodici(; column 13, line 39, insert a hyphen after "limi"

SIGNED AND
SEALED
MAY 19 1970

(SEAL)
Attest:

Edward M. Fletcher, Jr.
Attesting Officer

WILLIAM E. SCHUYLER, JR.
Commissioner of Patents